(12) United States Patent
Treyde

(10) Patent No.: US 6,742,632 B2
(45) Date of Patent: Jun. 1, 2004

(54) APPARATUS WITH VIBRATION-DAMPED COMPONENT, ESPECIALLY A BRAKE

(75) Inventor: Torsten Treyde, Koblenz (DE)

(73) Assignee: Lucas Industries plc (GB)

( * ) Notice: Subject to any disclaimer, the term of this patent is extended or adjusted under 35 U.S.C. 154(b) by 0 days.

(21) Appl. No.: 09/871,989

(22) Filed: Jun. 1, 2001

(65) Prior Publication Data
US 2001/0042661 A1 Nov. 22, 2001

Related U.S. Application Data

(63) Continuation of application No. PCT/EP99/09214, filed on Nov. 26, 1999.

(30) Foreign Application Priority Data

Dec. 1, 1998 (DE) .......................................... 198 55 467

(51) Int. Cl.⁷ .............................................. F16D 65/38
(52) U.S. Cl. ................................ 188/73.35; 188/73.37; 188/1.11 E
(58) Field of Search .............................. 188/71.1, 72.1, 188/73.35, 73.36, 73.37, 1.11 E

(56) References Cited

U.S. PATENT DOCUMENTS

| | | | |
|---|---|---|---|
| 974,549 A | 11/1910 | Bryant et al. | |
| 1,572,680 A | 2/1926 | Price | |
| 4,445,594 A | 5/1984 | Hoffman | |
| 4,860,859 A | * 8/1989 | Yamatoh et al. | 188/72.1 |
| 5,032,753 A | 7/1991 | Yamaguchi et al. | |
| 5,090,518 A | * 2/1992 | Schenk et al. | 188/72.1 |
| 5,099,961 A | 3/1992 | Dreilich et al. | |
| 5,315,203 A | 5/1994 | Bicos | |
| 5,660,251 A | * 8/1997 | Nishizawa et al. | 188/73.35 |
| 5,687,818 A | 11/1997 | Nishizawa et al. | |
| 5,746,292 A | 5/1998 | Tanaka et al. | |
| 5,860,494 A | * 1/1999 | Nishizawa et al. | 188/73.35 |
| 5,887,686 A | 3/1999 | Tanaka et al. | |
| 5,960,912 A | 10/1999 | Nishizawa et al. | |
| 6,125,974 A | * 10/2000 | Nishizawa et al. | 188/73.35 |

FOREIGN PATENT DOCUMENTS

| | | | |
|---|---|---|---|
| DE | 7801919 | 7/1978 | |
| DE | 3918369 | 8/1990 | |
| DE | 19505000 | 8/1996 | |
| DE | 19710965 | 10/1998 | |
| EP | 455299 | 4/1990 | |
| EP | 456301 | 4/1991 | |
| EP | 470064 | 2/1992 | |
| EP | 688969 | 1/1994 | |
| EP | 592290 | 4/1994 | |
| EP | 727591 | 8/1996 | |
| EP | 737823 | 10/1996 | |
| EP | 806589 | 11/1997 | |
| EP | 811782 | 12/1997 | |
| GB | 1381589 | 1/1975 | |
| JP | 59200819 | 11/1984 | |
| JP | 59200819 A | * 11/1984 | 188/73.35 |
| JP | 4054324 | 2/1992 | |
| JP | 5133435 | 5/1993 | |
| JP | 8-193633 | * 7/1996 | |
| JP | 8-320038 | * 12/1996 | |
| JP | 11-94707 | * 4/1999 | |
| WO | WO 9519508 | 7/1995 | |

* cited by examiner

Primary Examiner—Jack Lavinder
Assistant Examiner—Mariano Sy
(74) Attorney, Agent, or Firm—MacMillan, Sobanski & Todd, LLC

(57) ABSTRACT

The invention relates to the damping of mechanical vibrations of components in apparatuses. In particular, the invention relates to the damping of components of brakes. For this purpose, at least one piezoelectric element is provided, which is in engagement with the vibrating component and electrically excited in such a way that it damps vibrations of the component.

17 Claims, 8 Drawing Sheets

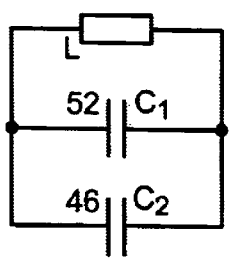
FIG. 6A
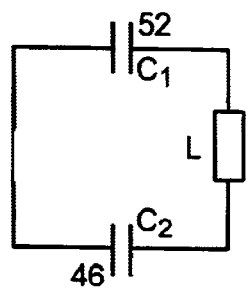
FIG. 6B
$$f_0 = \frac{1}{2\pi \sqrt{LC}}$$
$C = C_1 + C_2$
$\frac{1}{C} = \frac{1}{C_1} + \frac{1}{C_2}$
FIG. 7
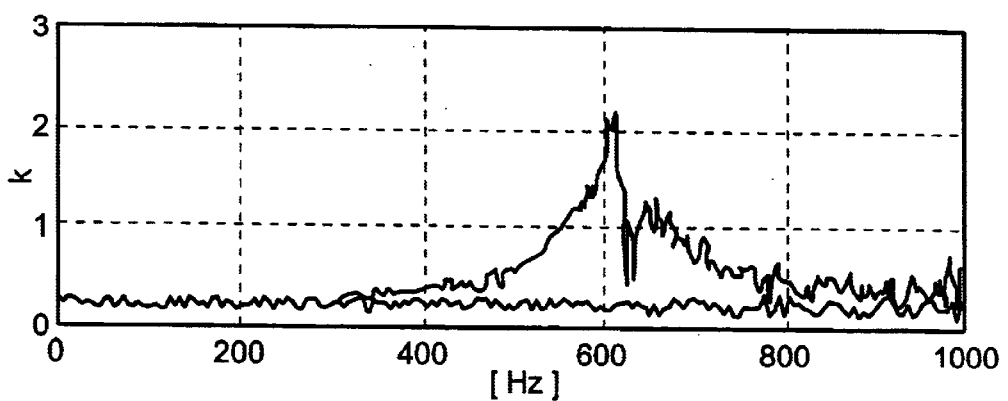

APPARATUS WITH VIBRATION-DAMPED COMPONENT, ESPECIALLY A BRAKE

This application is a continuation of PCT/EP99/09214 filed Nov. 26, 1999.

BACKGROUND OF THE INVENTION

The invention relates to an apparatus having a component, which may mechanically vibrate, wherein the mechanical vibration is undesirable and is therefore to be damped.

One example of such an apparatus is brakes. Although the invention is described below with regard to brakes, the invention may also be used in other apparatuses. Mechanical vibrations occur particularly in apparatuses, in which moving parts rub against one another and set the system into undesired vibrational states.

Said phenomenon has long been familiar in brakes. Mechanical vibrations in brakes, such as e.g. disk brakes or also drum brakes, frequently lead to highly undesirable sound radiation, so-called "brake squealing". For some time attempts have been made to theoretically elucidate the causes of brake squealing and combat them through practical measures.

Thus, U.S. Pat. No. 974,549, for example, proposes the provision of drill holes in steel wheels, gears or also other wheels in order to interrupt a vibration transmission path. In addition, it is proposed that a vibration-damping material, such as lead, be disposed in the bores.

U.S. Pat. No. 1,572,680 sets out to reduce noise generation in a drum brake by providing the anchor plate in a specific region with recesses or openings, which are filled with a specific material selected so as to inhibit vibrations of the anchor plate.

GB-PS 1381589 sets out to prevent undesirable noise generation in a fixed-caliper disk brake by using a mass coupling to relocate centres of gravity.

Prior art also includes the proposal from DE 195 05 000 A1, in the case of a floating frame brake, to dampen vibrations of the frame by providing a "vibration absorber" surrounded by silicone oil.

U.S. Pat. No. 4,445,594 sets out to avoid vibrations by fastening and supporting the outer brake pad of a partially lined floating-caliper disk brake via rubber elements in the bridge fingers.

JP-A 59-200819 also teaches that the bridge fingers of a disk brake be provided with vibration dampers. The vibration dampers are made of rubber or a plastics material and steel masses are moreover purposefully attached. By virtue of different natural frequencies of the bridge, on the one hand, and of the said masses, on the other hand, an attempt is made to combat vibration of the system and/or of its components.

EP-A 0 592 290 sets out to dampen vibrations in disk brakes by bracing a clamping wedge, on the one hand, with a side wall of the housing of the disk brake and, on the other hand, with a flange of the axle, to which the disk brake is fastened. In addition, an elastomeric layer may be provided between the clamping wedge and the side wall.

Further attempts of an extremely diverse nature at preventing undesirable mechanical vibrations in brakes are described e.g. in WO95/19508, EP 0 456 301 B1, EP 0 455 299 B1 and DE-GM 7801919.

For the suppression of vibrations in an internal combustion engine, EP 0 470 064 A2 discloses a device comprising a piezoelectric sensor element, which detects structure-borne sound vibrations, and an actor element, which generates structure-borne sound vibrations in phase opposition. In said case, signals of the sensor elements are supplied to the actor element via an automatic electronic control device, which also comprises an amplifier module for the supply of external energy.

SUMMARY OF THE INVENTION

The object of the invention is to provide simple, inexpensive and functionally reliable means of effectively preventing the mechanical vibrating of a component of an apparatus.

For solving said technical problem the invention proposes an apparatus and/or a brake having the features of claims 1, 2 and 4.

As is known, piezoelectric elements may deform upon application of a voltage and so, when a periodic voltage is applied, execute a mechanical vibration, i.e. for example, periodically deform. According to the invention, said mechanical vibration of the piezoelectric element is then used in such a way that it counteracts the vibration of the component of the apparatus which is to be damped. According to the fundamental rules of physics this may occur, for example, by producing a suitable phase relationship between the mechanical vibration of the component to be damped and the deformation vibration of the piezoelectric element. In said case, the vibration of the component and the vibration of the piezoelectric element need not necessarily have the same frequency, rather a relationship between the frequencies according to whole-number multiples ("harmonic") is generally sufficient to achieve a damping effect.

The refinement of the invention according to claim 2 offers a number of advantages. First of all, a piezoelectric element is used in order, by means of the mechanical vibration of the component to be damped, to generate the voltage which is applied to another piezoelectric element (or alternatively even the same piezoelectric element, see below) in order to produce the mechanical vibration of the piezoelectric element ("electrostriction") and hence dampen the undesired vibration of the component. Such a system is self-regulating in the sense that the vibration-damping periodic vibration of the one piezoelectric element arises through voltage generation at the other piezoelectric element only when the vibration-endangered component of the apparatus actually vibrates (which need not necessarily always be the case). In said variant of the invention, the periodic electrical excitation of the vibration-damping piezoelectric element diminishes (i.e. the applied voltage reduces) or is completely interrupted when the mechanical vibration of the component to be damped diminishes or stops. The system does not even require external energy (voltage) to become effective, although the use of external additional sources of electrical energy for amplification purposes may be provided in more complex systems.

The previously described embodiment of the invention does not necessarily require two different piezoelectric elements, the teaching alternatively being realizable e.g. according to claim 1 with a single piezoelectric element, which both generates a voltage piezoelectrically as a result of being acted upon by the mechanically vibrating component of the apparatus and is suitably excited by said generated voltage itself with such phase displacement that it continues to vibrate in a state, in which it damps the mechanical vibration of the component of the apparatus. In said embodiment of the invention, therefore, the piezoelectric element vibrates in two states (modes): firstly, it is periodically deformed by the mechanical vibration of the component to be damped and so, because of the piezoelectric effect, periodically generates a voltage and, secondly, said voltage itself, optionally after suitable phase displacement and/or modulation, is reapplied for the purpose of electrical excitation to the same piezoelectric element in order to set the latter into a state of electrostrictive periodic mechanical vibration, as a result of which the mechanical vibration of the component of the apparatus is damped. Here too, as described above, the damping is self-regulating: if no component of the apparatus is vibrating, there is also no piezoelectric voltage generated and, conversely, also no electrostrictive vibration generated for damping (with the result that an undesired vibration triggered by the piezoelectric crystal itself is avoided). Said self-regulation of the system is proportional, i.e. the quantity of the damping vibration of the crystal depends upon the quantity of the undesired mechanical vibration of the component of the apparatus which is to be damped.

According to a preferred refinement of the invention it is provided that by means of an inductor a phase relationship is adjusted between the generated periodic voltage and the voltage applied for damping purposes.

A further preferred refinement of the invention provides that at least one piezoelectric element is inserted as a capacitive element in at least one resonant electric circuit, and that said resonant circuit has a resonant frequency, which is tuned to the mechanical vibration frequency which is to be damped.

In said case, at least two piezoelectric elements are preferably connected either in parallel or in series in a resonant circuit having an inductor in such a way that the resonant frequency of said resonant circuit is substantially tuned to the mechanical vibration frequency of the component to be damped. In said case, in the previously described sense the one piezoelectric element may because of the piezoelectric effect generate a voltage, which is applied to the other piezoelectric element in order on the basis of electrostriction (i.e. the reverse piezoelectric effect) to effect mechanical vibration of said piezoelectric element and hence damping of the vibration of the component of the apparatus. The piezoelectric elements therefore operate reciprocally (crosswise) and are identical in their functions.

The invention relates not only to apparatuses of the type discussed here but also to methods of damping components in apparatuses, wherein the method realizes the previously described teachings.

As has already been mentioned above, the particularly preferred field of application of the invention is brakes, in particular disk brakes, such as floating-caliper or floating-frame brakes, or alternatively drum brakes.

In said case, it is preferentially provided that the brake is a floating-caliper or floating-frame brake and that the component, which may generate noises, is a pad carrier and/or a part of the caliper, such as a bridge finger.

In said case, it is preferentially provided that at least one piezoelectric element acts between the pad carrier and a part of the caliper and/or frame of the brake.

Preferably, at least two piezoelectric elements are disposed in such a way that they are spaced apart from one another in peripheral direction of the brake (i.e. in the direction of rotation of the brake disk; i.e. tangentially). In said case, in relation to a radial centre plane of the disk brake the preferred arrangement may be one piezoelectric element on the run-in side and another piezoelectric element on the run-out side of the brake. Measurements have shown that with such an arrangement in a disk brake a particularly effective damping of the mechanical vibrations of the system is achievable.

As explained above, preferred refinements of the invention provide that the piezoelectric element or the piezoelectric elements are inserted in an electric circuit in order to transmit voltages and give rise to the described feedback effect. For phase-angle adjustment an inductor, i.e. a component with an inductive effect, may in said case be provided in the electric circuit. According to a preferred refinement of the invention, the inductor may be integrated directly in a component of the brake, e.g. the component to be damped, or alternatively mounted on such a component of the brake, e.g. in the immediate vicinity of the piezoelectric element, so that it may be mounted together with the latter.

Given the use of two or more piezoelectric elements in a resonant circuit, the latter is preferentially tuned in such a way that the damping effect of at least one of the piezoelectric elements is at its maximum in the region of a mechanical vibration frequency of the component of the apparatus which is mainly to be damped.

In a brake, the at least one piezoelectric element is preferentially disposed in the force flux of a brake application force of the brake because the friction-induced vibrations arise in said force flux path and hence may also be effectively damped there.

The invention may be realized not only generally in apparatuses and in particular brakes of the described type but also in individual parts of such apparatuses and/or brakes, such as the following.

Thus, a brake pad for a disk brake may comprise a piezoelectric element for vibration damping purposes. In said case, the piezoelectric element or elements may be fastened to, or integrated in, the carrier plate of the brake pad. It is even possible to design the carrier plate of the brake pad as a whole as a piezoelectric element or to fashion a part of the carrier plate as a piezoelectric element.

Analogous applications of the inventive idea described above for brake pads are possible in the case of brake shoes 70 for drum brakes 72 shown in FIG. 13, actuating pistons for brakes, brake carriers for disk brakes and anchor plates 74 for drum brakes, which may therefore be in each case entirely or partially of a piezoelectric design or may comprise one or more piezoelectric elements.

To achieve effective damping of the mechanical vibration of the component of the apparatus or of the components of the apparatus, according to a further preferred refinement of the apparatus according to the invention it is provided that at least one piezoelectric element is disposed close to an antinode of the mechanically vibrating component. An antinode in the present context is a point, at which the mechanically vibrating component vibrates at maximum amplitude. An anti-periodically vibrating piezoelectric element acting at said point produces a particularly high damping effect.

BRIEF DESCRIPTION OF THE DRAWINGS

FIGS. 6A and 6B two block diagrams of electric circuits comprising two piezoelectric elements and an inductor;

FIG. 7 measurements relating to the coupling behaviour of two piezoelectric elements as a function of the vibration frequency;

DETAILED DESCRIPTION OF THE PREFERRED EMBODIMENTS

Figure 1:
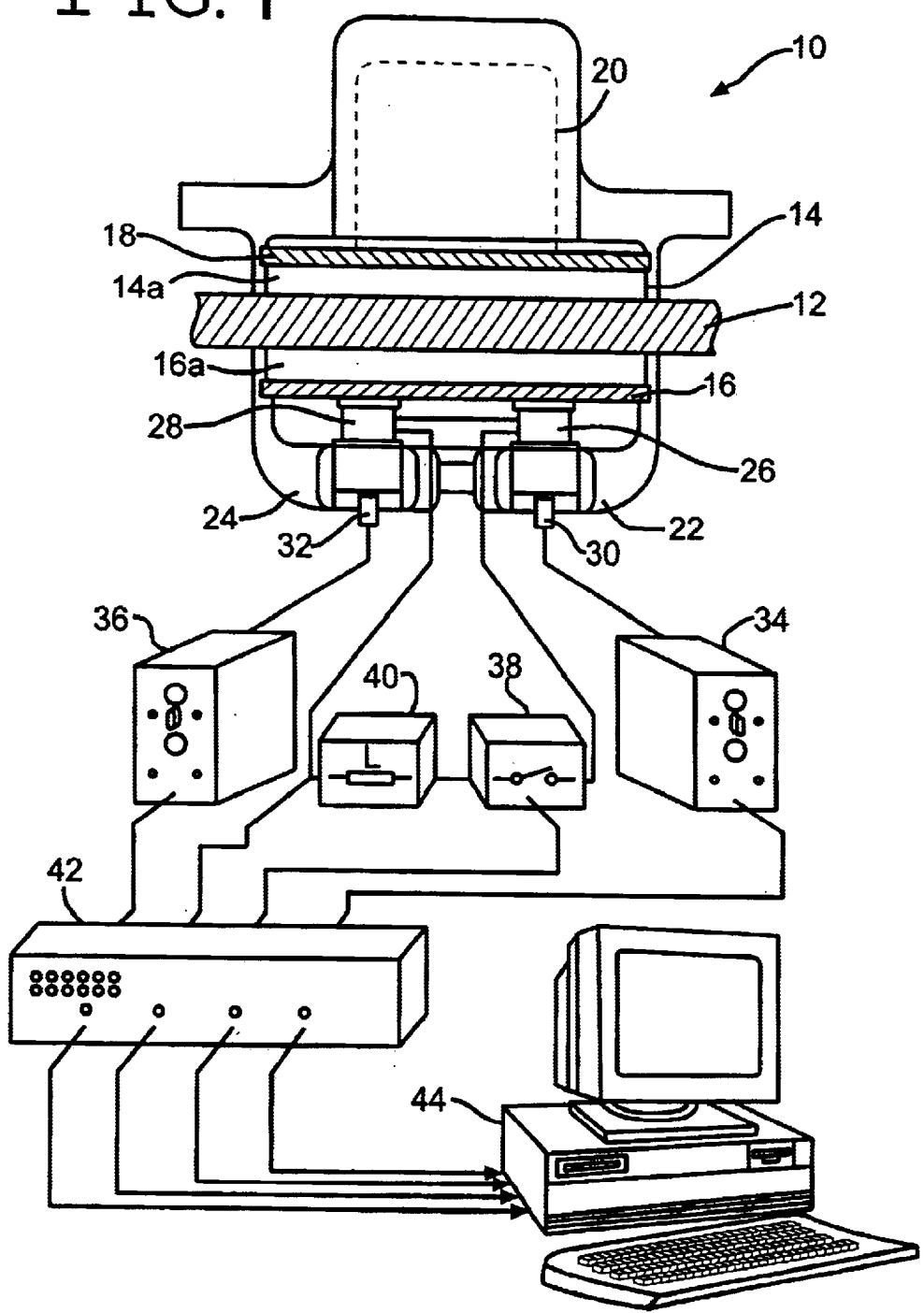
FIG. 1 a disk brake with a measuring arrangement for explaining the fundamental principles of the invention.

FIG. 1 shows as an embodiment an apparatus, in which the mechanical vibration of a component is damped, namely a partially lined floating-caliper disk brake 10 comprising a brake disk 12 and a caliper 14. In a known manner, during braking the brake disk 12 is clamped in between two brake pads 16a, 18a. The brake pads 16a, 18a are fastened to pad carrier plates 16, 18 made of metal. During braking, an actuating piston (cf. FIG. 8, 20a) is moved axially in a cylinder 20. The caliper 14 engages with two bridge fingers 22, 24 over or behind the indirectly actuated pad carrier 16 in a known manner.

Disposed according to FIG. 1 between the bridge fingers 22, 24 and the pad carrier plate 16 are two force sensors 26, 28 which measure, in each case, the forces acting in axial direction (in the usual parlance, axially in relation to the axis of the disk brake and/or the direction of the brake application force). Disposed at the outside of the bridge fingers 22, 24 are acceleration sensors 30, 32. The previously described arrangement is used for measurement purposes. An embodiment of an apparatus fashioned according to the invention is obtained when in the previously described arrangement the two force sensors 26, 28 are replaced by piezoelectric elements. This is explained further below. First of all, with regard to the measurements using the arrangement according to FIG. 1:

The measured values of the two acceleration sensors 30, 32 are input via (charge) amplifiers 34, 36 and a low-pass filter 42 into a computer 44 for evaluation.

In a corresponding manner, measured values of the two force sensors 26, 28 are also input via the low-pass filter 42 into the computer 44 for evaluation.

Figure 2:
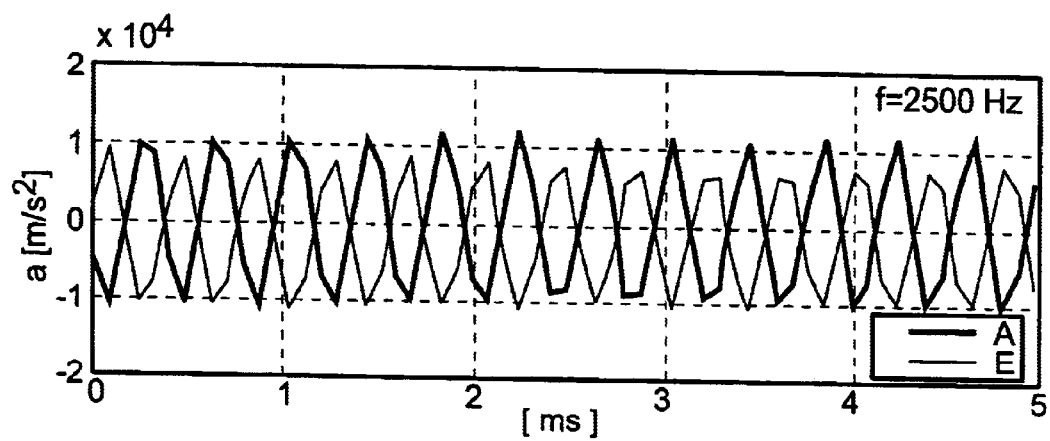
FIG. 2 accelerations of the run-in-side and run-out-side bridge finger of a partially lined floating-caliper disk brake measured with a measuring arrangement according to FIG. 1.

FIG. 2 shows the results measured by the acceleration sensors 30, 32 during a braking operation. In FIG. 2, the time in milliseconds is plotted on the x-axis and the measured acceleration a is plotted on the y-axis. The system of pad carrier plate 16 and bridge fingers vibrates in said case at a frequency f=2500 Hz. Damping is not yet provided. In FIG. 2 a thick line A represents the acceleration at the run-out-side bridge finger and a thinner curve E represents acceleration at the run-in-side bridge finger. If in FIG. 1 the brake disk 12 moves from right to left, the bridge finger 22 would be at the run-in side and the bridge finger 24 at the run-out side.

The acceleration a in FIG. 2 shows a periodic vibration at 2500 Hz, i.e. clearly in the range audible to the human ear. According to the measurements of FIG. 2, the two bridge fingers present identical-frequency vibrations which are in phase opposition.

Figure 3:
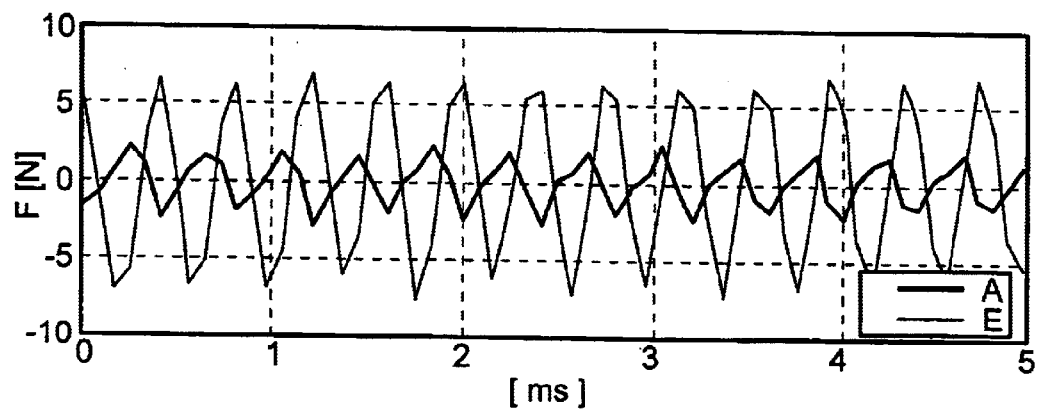
FIG. 3 forces at the run-in-side and run-out-side bridge fingers of the disk brake measured with an arrangement according to FIG. 1.

FIG. 3 shows over the same time scale the forces F, which are effective at the bridge fingers and measured by the force sensors 26, 28. The curve A illustrated by a bold line again shows the measurement results at the run-out-side bridge finger and the finer curve E the measurement results for the run-in-side bridge finger.

FIGS. 2 and 3 therefore show the mechanical vibration of components of the system "brake" which is to be damped.

Figure 8:
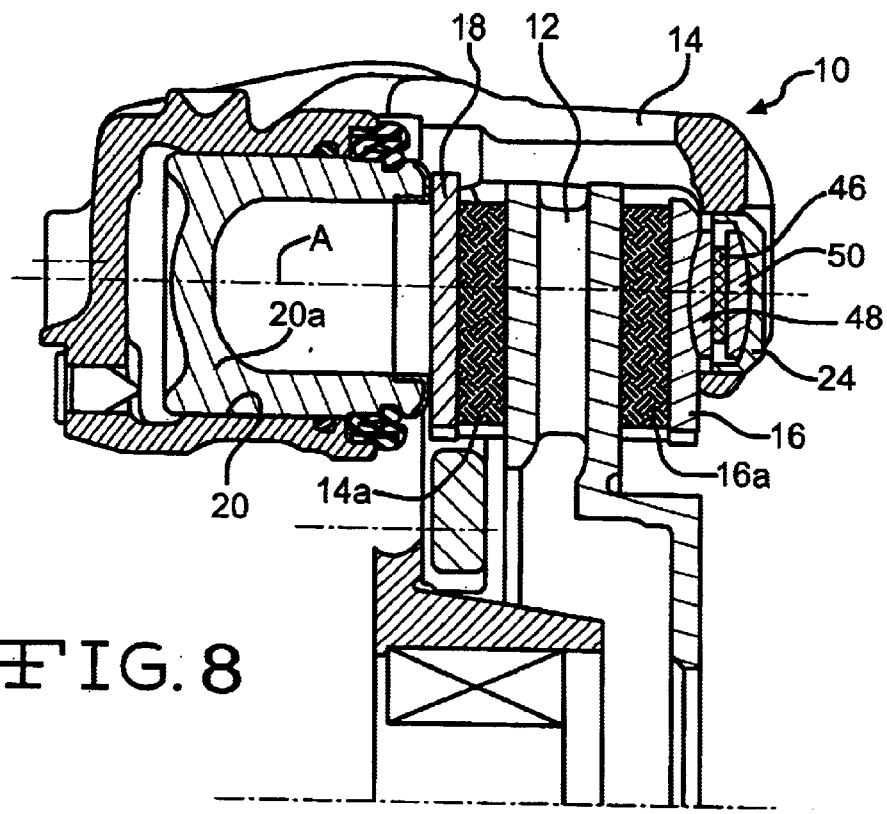
FIG. 8 a partially lined floating-caliper disk brake with piezoelectric elements for damping.

For said purpose, in the arrangement according to FIG. 1 the two force sensors 26, 28 are replaced by piezoelectric elements. This is illustrated by way of example in FIGS. 8 to 10. The piezoelectric elements 46, 52 shown there replace the force sensors 26, 28. Further particulars of the disk brake according to FIG. 8 are described further below.

The two piezoelectric elements thus used instead of the force sensors 26, 28 in the arrangement according to FIG. 1 are electrically connected via a switch 38. The electric circuit of the two piezoelectric elements and the switch 38 moreover contains an inductor (L) 40. FIG. 6B shows the block diagram (wherein it is necessary to imagine the switch 38 added to the circuit).

Figure 4:
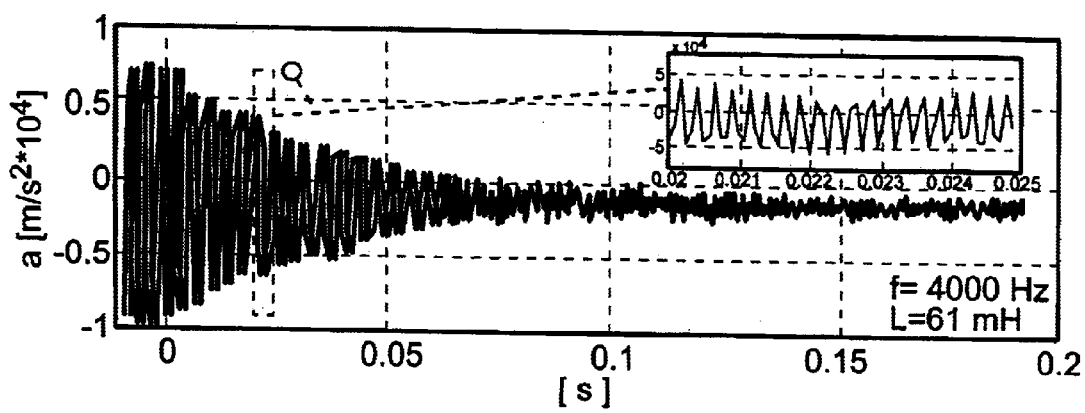
FIG. 4 the acceleration of one of the bridge fingers measured with an arrangement according to FIG. 1 given the use of piezoelectric elements for damping.

FIG. 4 shows measurement results given the use of the previously described piezoelectric elements. The acceleration sensors 30, 32 once more measure the accelerations at the bridge fingers 22, 24. At the time 0 on the y-axis according to FIG. 4 the switch 38 is closed during a braking operation. FIG. 4 shows that before the time "0" the bridge fingers vibrate strongly at the illustrated amplitudes of the acceleration a. The basis for said measurement is a frequency of the mechanical vibration of f=4000 Hz. The inductance L is 61 mH.

As soon as the switch 38 is closed at the time "0", the piezoelectric elements 46, 52 come into damping effect, as FIG. 4 reveals. One piezoelectric element is periodically compressed by the mechanical vibration between the pad carrier plate 16 and the bridge fingers 22, 24 and hence piezoelectrically generates a periodic voltage of identical frequency. Said periodic voltage is applied to the other piezoelectric element so that the latter, because of the reverse piezoelectric effect, starts to mechanically vibrate, i.e. periodically expands and contracts. By said means the vibration of the system of pad carrier plate 16 and bridge fingers is damped. As FIG. 4 shows, the shrinkage falls almost completely away in less than 0.1 sec.

Figure 5:
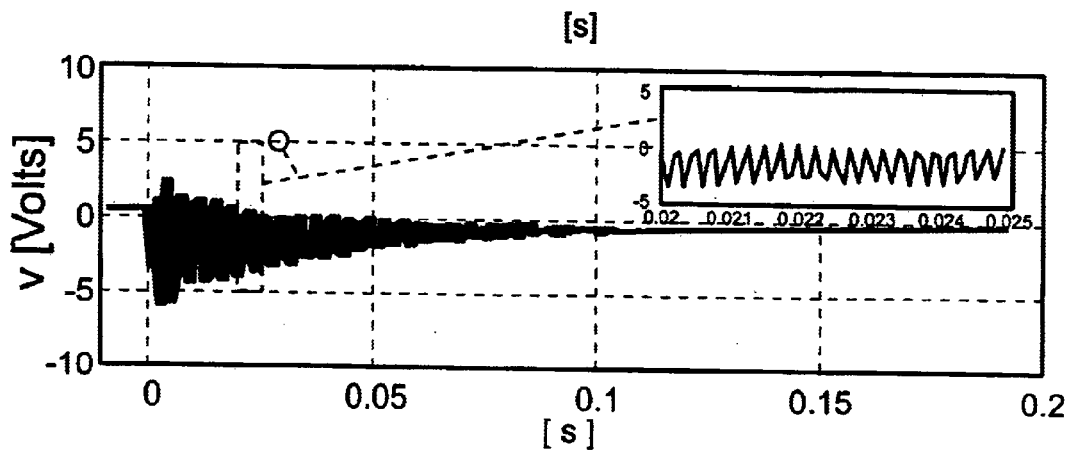
FIG. 5 the time characteristic of the voltage of one of the two piezoelectric elements given measurement in accordance with FIG. 4.

FIG. 5 shows the measured piezoelectric voltage U. As soon as the switch 38 is closed at the time "0", the voltage U across the two piezoelectric elements 46, 52 also falls to negligibly low values in much less than 0.1 sec, which indicates that the self-damping effect of the two cross-connected and reciprocally acting piezoelectric elements is highly effective.

FIGS. 6A and 6B show block diagrams of possible electric circuits, according to which two piezoelectric elements having the capacitances $C_1$ and $C_2$ as well as the inductor L (40) may be connected; in each of said Figures the total capacitance and also the resonant frequency $f_o$ are indicated. The capacitances and inductances are preferentially selected in such a way that the resonant frequency of the resonant circuit corresponds to the mechanical vibration to be damped or is at least in a whole-number ratio thereto.

FIG. 7 shows the advantage of such a tuning of the electrical resonant frequency of the resonant circuit comprising the piezoelectric elements to the frequency of the mechanical vibration of the system which is to be damped. In FIG. 7 a coupling factor k is plotted on the y-axis and the frequency is plotted on the x-axis. The coupling factor k is a measure of how strong the coupling, and hence the damping effect, of the two piezoelectric elements is. The bottom curve extending substantially at the value 0.3 illustrates the situation where the two piezoelectric elements 46, 52 are connected to one another directly without an intermediate inductor. The top curve with a maximum at approximately 600 Hz illustrates the situation where an inductor of 900 mH is connected to the system and so a resonant circuit is formed, the resonant frequency of which is around 600 Hz. In said case, the coupling factor in the resonant situation dramatically increases (to values of around 2). Thus, by operating the resonant circuits according to FIGS. 6A and 6B in the resonant range and by tuning the resonant frequency $f_o$ of the resonant circuit to the mechanical vibration frequency which is to be substantially prevented, an intrusive vibrating of components of the brake may be effectively prevented.

FIG. 8 shows particulars of a partially lined floating-caliper disk brake 10, a description of the conventional design of which has already been given above. According to FIGS. 8, 9 and 10 two piezoelectric elements 46, 52 are disposed between the indirectly actuated pad carrier plate 16 and the bridge fingers 22, 24, and namely in such a way that the force flux is transmitted from the bridge fingers via the piezoelectric elements to the pad carrier plate. The piezoelectric elements are clamped in between small metal plates 48, 50, which in each case are curved concavely at the outside and engage into corresponding convex troughs in the bridge finger and the pad carrier plate respectively. FIG. 10 shows by way of example two troughs 54, 56 in the pad carrier plate 16.

According to FIG. 8 the engagement between the piezoelectric element and the component, the vibration of which is to be damped, may also be effected indirectly, i.e. for example, via an intermediate component such as the small metal plates shown here.

Figure 9:
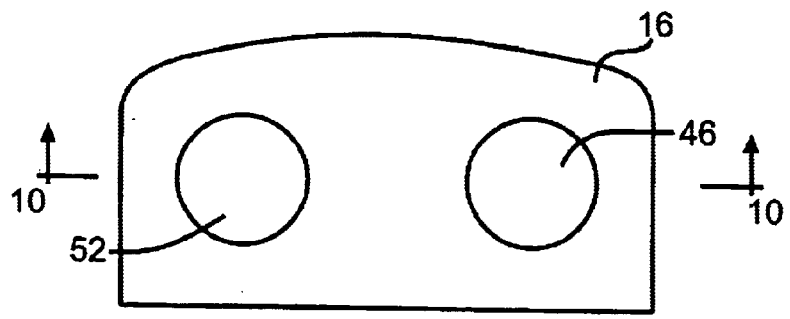
FIG. 9 an axial plan view of a brake pad of a brake according to FIG. 8 with piezoelectric elements.
Figure 10:
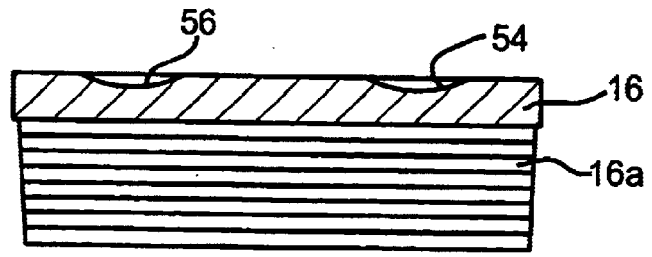
FIG. 10 a section through the brake pad according to FIG. 9; taken along line 10—10.

As FIGS. 8 to 10 reveal, the two piezoelectric elements 46, 52 are disposed approximately at the height of the effective centre of the brake application force (corresponding to the axis A according to FIG. 8) in such a way that one piezoelectric element is disposed at the run-in side and the other piezoelectric element at the other side, i.e. at the run-out side.

Figure 11:
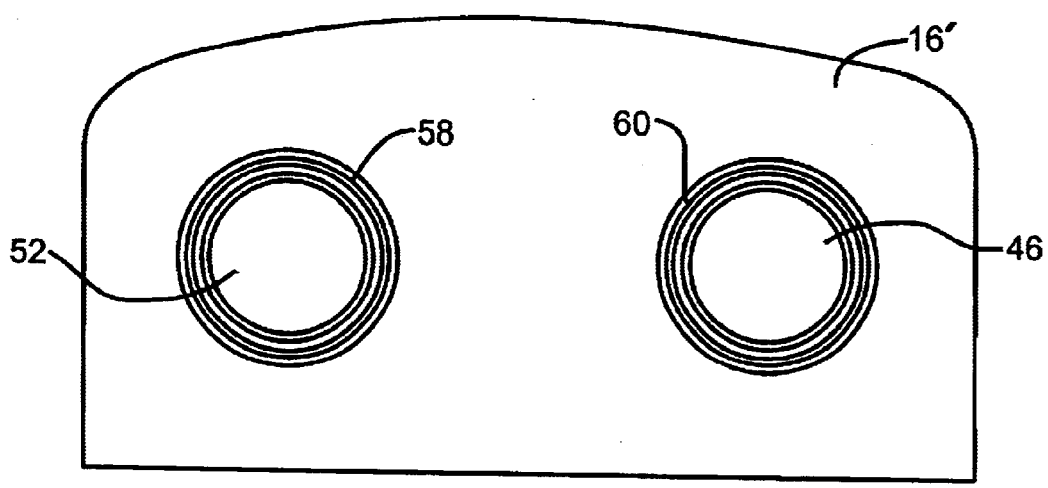
FIG. 11 a plan view of another embodiment of a brake pad with piezoelectric elements and FIG. 12 a section through the brake pad according to FIG. 11.
Figure 12:
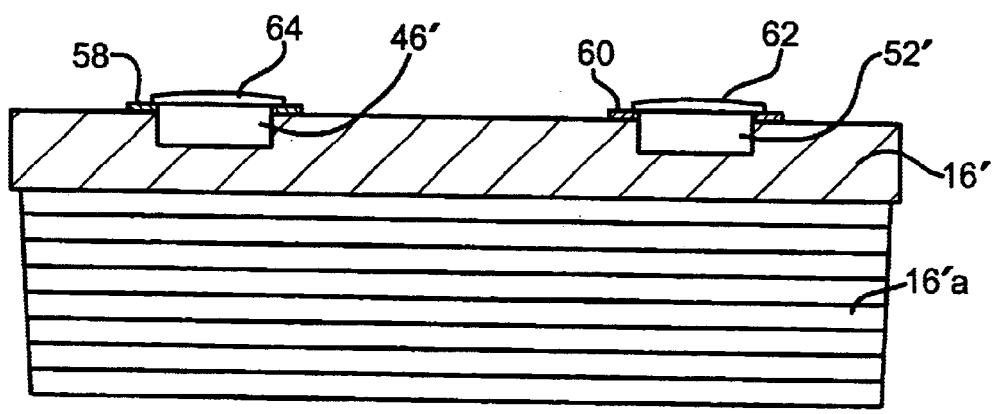

FIGS. 11 and 12 show modifications of the embodiment according to FIGS. 9 and 10. The piezoelectric elements 46' and 52' are disposed in cylindrical recesses in the pad carrier plate 16'. Inductors 58, 60 are likewise mounted directly on the pad carrier plate 16', namely with the aid of bearing disks 62, 64, which in the illustrated embodiment are made of plastics material, e.g. polyoxymethylene. The inductors 58, 60 take the form of helical windings.

The illustrated arrangements of piezoelectric elements according to FIGS. 8 to 12 may be connected in various ways. Each of the piezoelectric elements may be connected separately as an individual subassembly to an inductor so as to form an independent resonant circuit, wherein the mechanical vibration of the brake acting upon the piezoelectric element generates a voltage, which by means of the inductor reacts in such a way upon the piezoelectric element that the reverse piezoelectric effect (i.e. the mechanical vibration of the piezoelectric element as a result of the applied voltage) effects damping in the sense described above.

On the other hand, the two (or more) piezoelectric elements may alternatively form part of a common resonant circuit, as described above.

In the illustrated embodiments, the resonant circuits comprising the piezoelectric elements do not require any external energy. It is however alternatively possible to amplify the piezoelectric voltages using auxiliary electronic means.

It is also possible to make the inductances and capacitances used in the electric circuits adjustable by way of adaptation to the system provided in each case.

For a given apparatus, such as e.g. an actual disk brake, the performance data, in particular the capacitances, of the piezoelectric elements to be used and the inductances are optimized experimentally using an arrangement according to FIG. 1 and are then correspondingly used for the given system. For optimum tuning of the frequencies and optimization of the damping it may be necessary to provide additional capacitors and/or inductors and/or resistors in the resonant circuits.

Coupling losses between the piezoelectric elements may be compensated by external energy.

It is also possible for a plurality of piezoelectric elements to be connected in each case in such a way that the piezoelectric voltages generated in them are coupled (superimposed) and that said coupled voltages are applied in each case to the same or further piezoelectric elements in order to achieve the damping by means of the reverse piezoelectric effect.

Figure 13:
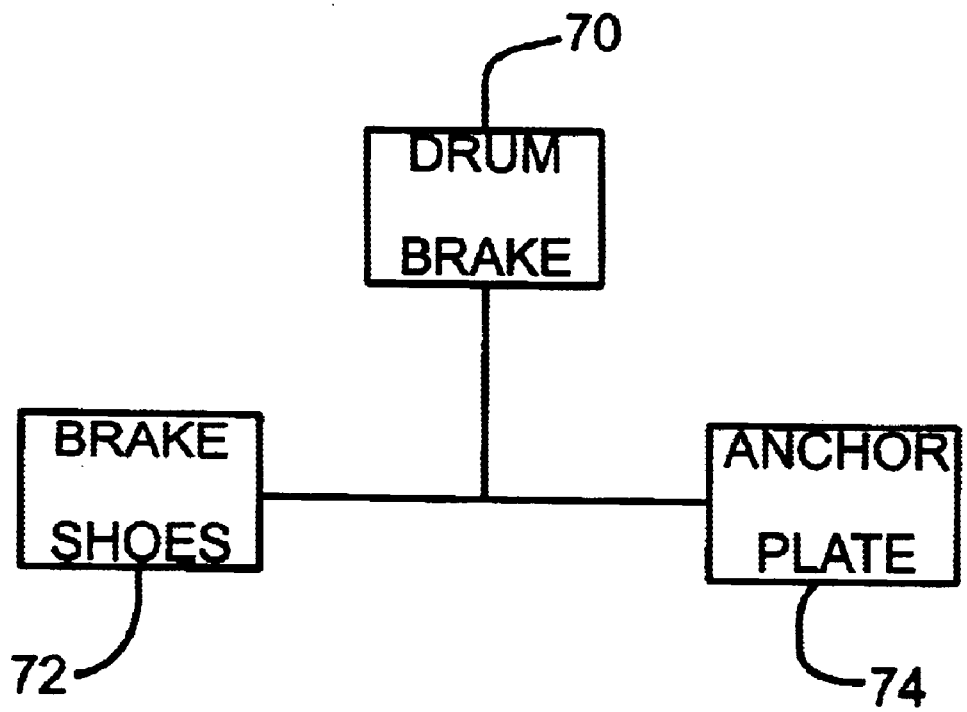
FIG. 13 a schematic diagram of a portion of a drum brake assembly.

While the preferred embodiment of the invention has been illustrated and described above for disc brakes, it will be appreciated that the invention also may be practiced upon conventional drum brakes. A schematic diagram of a drum brake assembly 70 is shown in FIG. 13 and includes a pair of brake shoes 72 mounted upon an anchor plate 74.

Figure 14:
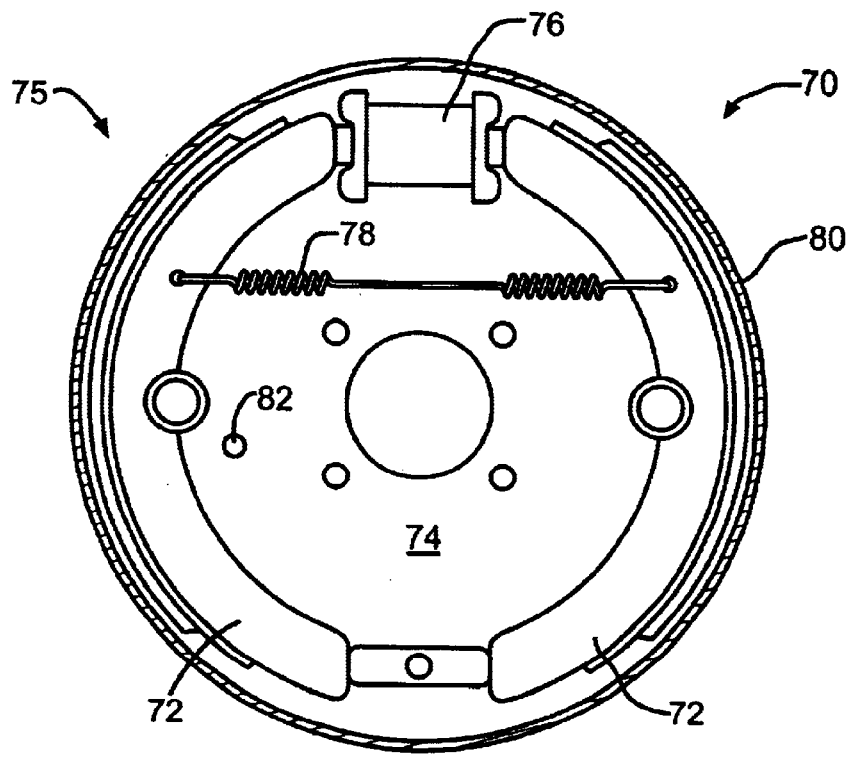
FIG. 14 a plan view of a drum brake assembly that includes an alternate embodiment of the invention.

An alternate embodiment of the invention, shown generally at 75, that includes a single piezoelectric element mounted upon a drum brake assembly 70 is illustrated in FIG. 14. Components shown in FIG. 14 that are similar to components shown in preceding Figures have the same numerical identifiers. As shown in FIG. 14, the alternate embodiment 75 includes a pair of brake shoes 72 movably mounted upon an anchor plate 74. A brake cylinder 76 is also mounted upon the anchor plate 74 between the ends of the pair of brake shoes 72 with the brake cylinder 76 operative to urge the brake shoes 72 away from one another. The alternate embodiment 75 also includes a return spring 78 connected to the brake shoes 72 that is operative to urge the brake shoes 72 toward one another. The brake shoes 72 are disposed within a corresponding brake drum 80. A single piezoelectric element 82 is mounted the anchor plate 74. During operation of the drum brake assembly 70, the piezoelectric element 82 is deformed by mechanical vibrations of the anchor plate 74 and, upon element 82 is deformed by mechanical vibrations, the piezoelectric element 82 generates a voltage. The generated voltage is applied to the single piezoelectric element 82 with a phase shift only such that the mechanical vibrations of the anchor plate 74 are damped.

Figure 15:
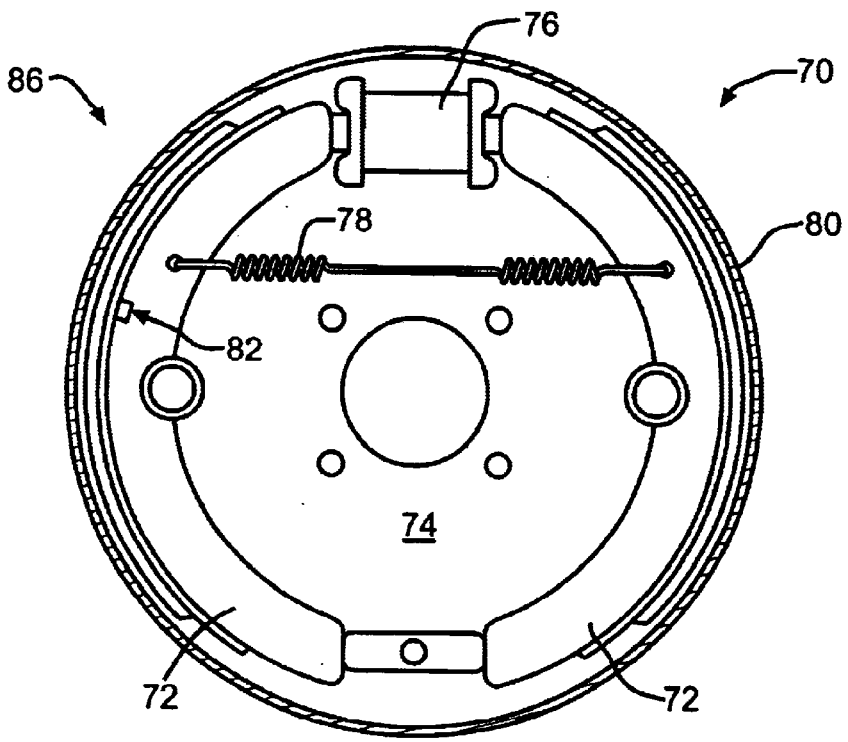
FIG. 15 a plan view of a drum brake assembly that includes another alternate embodiment of the invention.

Another alternate embodiment of the invention, shown generally at 86, that includes a single piezoelectric element mounted upon a drum brake assembly 70 is illustrated in FIG. 15. Components shown in FIG. 15 that are similar to components shown in preceding Figures have the same numerical identifiers. As shown in FIG. 15, the alternate embodiment 86 includes a pair of brake shoes 72 movably mounted upon an anchor plate 74. A brake cylinder 76 is also mounted upon the anchor plate 74 between the ends of the pair of brake shoes 72 with the brake cylinder 76 operative to urge the brake shoes 72 away from one another. The alternate embodiment 86 also includes a return spring 78 connected to the brake shoes 72 that is operative to urge the brake shoes 72 toward one another. The brake shoes 72 are disposed within a corresponding brake drum 80. A single piezoelectric element 82 is the piezoelectric element 82 is deformed by mechanical vibrations of the brake shoe 72 and, upon such mechanical vibrations, the piezoelectric element 82 generates a voltage. The generated voltage is applied to the single piezoelectric element 82 with a phase shift only such that the mechanical vibrations of the brake shoe 72 are damped.

In accordance with the provisions of the patents statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A vehicle floating caliper disc brake assembly comprising:
    a brake caliper, said caliper including a first portion that has a bore formed therein and a second portion extending from said first portion;
    a single actuating piston disposed within said bore;
    a first brake pad mounted upon an end of said actuating piston;
    a second brake pad mounted upon said second portion of said brake caliper opposite from said actuating piston;
    a single piezoelectric element mounted between said second brake pad and said second portion of said brake caliper; and
    an inductor electrically connected directly to said single piezoelectric element to form a passive resonant circuit whereby said single piezoelectric element is deformed by mechanical vibrations of said second brake pad and, upon being deformed by such mechanical vibrations, said piezoelectric element generates a voltage that is applied to said inductor, said inductor causing a phase shift of said voltage, said phase shifted voltage then being applied to said single piezoelectric element with said phase shift only such that the mechanical vibrations of said second brake pad are damped.

2. The brake assembly according to claim 1 wherein by means of an inductor electrically connected directly to said piezoelectric element a phase relationship is adjusted between said generated voltage and said phase shifted voltage that is applied for damping purposes.

3. The brake assembly according to claim 2 wherein the inductor is integrated in or mounted on or in a component of the brake member.

4. The brake assembly according to claim 1 wherein said piezoelectric element is inserted as a capacitive element an electric resonant circuit, and that said resonant circuit has a resonant frequency which is tuned to the mechanical vibration frequency which is to be damped.

5. The brake assembly according to claim 1 wherein the piezoelectric element is disposed in the force flux of a brake amplification force of the brake member.

6. The brake assembly according to claim 1 wherein the piezoelectric element is disposed close to an antinode of the mechanically vibrating member.

7. A vehicle brake component comprising:
    a single brake member;
    a first piezoelectric element mounted upon said single brake member;
    a second piezoelectric element also mounted upon said single brake member; and
    an inductor electrically connected directly to said first piezoelectric element and forming a passive resonant circuit therewith whereby the first piezoelectric element is deformed by mechanical vibrations of a part of said brake member and, upon said vibrations, said first piezoelectric element generates a voltage that is applied to said inductor that forms said passive resonant circuit with said first piezoelectric element and that said passive resonant circuit shifts the phase of said generated voltage, said phase shifted generated voltage being applied to said second piezoelectric element with such a phase shift that said second piezoelectric element vibrates such that the mechanical vibrations of said part of said brake member are damped.

8. The brake assembly according to claim 2 wherein one of said piezoelectric elements is disposed at the run-in side of the brake member and the other of said piezoelectric elements is disposed at the run-out side of the brake member.

9. The brake component according to claim 7 wherein said inductor is electrically connected only to said first and second piezoelectric members and mounted upon said brake member.

10. The brake component according to claim 7 wherein at least one of the first and second piezoelectric elements are inserted as a capacitive element in at least one electric resonant circuit, and that the resonant circuit has a resonant frequency which is tuned to the mechanical vibration frequency which is to be damped.

11. The brake component according to claim 7 the first and second piezoelectric elements are inserted in a resonant circuit which is tuned in such a way that the damping effect of at least one of the first and second piezoelectric elements is at its maximum in the region of the mechanical vibration frequency which is mainly to be damped.

12. The brake component according to claim 7 wherein said brake member is a brake drum.

13. The brake component according to claim 7 wherein the brake member is a brake pad for a disk brake.

14. The brake component according to claim 7 wherein the brake member is a brake shoe for a drum brake.

15. The brake component according to claim 7 wherein the brake member is an anchor plate for a drum brake.

16. A drum brake assembly comprising:
    an anchor plate;
    a pair of brake shoes movably mounted upon said anchor plate;
    a brake cylinder mounted upon said anchor plate between the ends of said pair of brake shoes, said brake cylinder operative to urge said brake shoes away from one another;
    a return spring connected to said brake shoes, said return spring operative to urge said brake shoes toward one another; and
    a single piezoelectric element mounted directly upon said anchor plate, said single piezoelectric element being deformed by mechanical vibrations of said anchor plate and, upon such mechanical vibrations, said piezoelectric element generates a voltage, wherein said generated voltage is applied to said single piezoelectric element with a phase shift only such that the mechanical vibrations of said anchor plate are damped.

17. A drum brake assembly comprising:

an anchor plate;

a pair of brake shoes movably mounted upon said anchor plate;

a brake cylinder mounted upon said anchor plate between the ends of said pair of brake shoes, said brake cylinder operative to urge said brake shoes away from one another;

a return spring connected to said brake shoes, said return spring operative to urge said brake shoes toward one another; and a single piezoelectric element mounted directly upon one of said brake shoes, said single piezoelectric element being deformed by mechanical vibrations of said brake shoe and, upon such mechanical vibrations, said piezoelectric element generates a voltage, wherein said generated voltage is applied to said same single piezoelectric element mounted upon said brake shoe with a phase shift only such that the mechanical vibrations of said brake shoe are damped.

* * * * *

UNITED STATES PATENT AND TRADEMARK OFFICE
CERTIFICATE OF CORRECTION

PATENT NO. : 6,742,632 B2
DATED : June 1, 2004
INVENTOR(S) : Torsten Treyde

It is certified that error appears in the above-identified patent and that said Letters Patent is hereby corrected as shown below:

Column 9,
Line 64, after "capacitive element" insert -- in --.

Column 10,
Line 41, after "claim 7" insert -- wherein --.

Signed and Sealed this

Twentieth Day of July, 2004

JON W. DUDAS
*Acting Director of the United States Patent and Trademark Office*